UNITED STATES PATENT OFFICE.

ADOLPH BAEYER, OF MUNICH, BAVARIA, ASSIGNOR TO BADISCHE ANILIN AND SODA FABRIK, OF MANNHEIM, GERMANY.

MANUFACTURE OF ARTIFICIAL INDIGO.

SPECIFICATION forming part of Letters Patent No. 251,500, dated December 27, 1881.

Application filed September 29, 1881. (Specimens.)

*To all whom it may concern:*

Be it known that I, ADOLPH BAEYER, a subject of the King of Bavaria, residing at Munich, in the Kingdom of Bavaria and Empire of Germany, have invented new and useful Improvements in the Preparation of a New Material for the Manufacture of Artificial Indigo, of which the following is a specification.

My invention consists in the discovery that diisatogen may be obtained from orthodinitroacetenylphenyl by the action of concentrated sulphuric acid, and subsequently with fuming sulphuric acid.

As an example of the manner in which my invention may be carried into effect, I proceed as follows: I take one part, by weight, of orthodinitroacetenylphenyl and mix the same with from five to ten parts, by weight, of concentrated sulphuric acid of about 1.848 specific gravity. I then add gradually, and with due care to prevent any considerable rise of temperature, as much fuming sulphuric acid containing about twenty per cent. of sulphuric anhydride as will be found necessary to produce a clear solution. The said solution, which possesses a red color, is then thrown into a large quantity of cold water, or, by preference, into alcohol, when a red precipitate of diisatogen will be formed, which is then filtered, washed, and dried.

Some characteristic properties of diisatogen thus produced as above described are as follows: Diisatogen is a red crystalline solid, almost insoluble in alcohol and similar solvents, sparingly soluble in chloroform, and easily soluble in aniline, carbolic acid, and hot nitrobenzine. By the action of reducing or deoxidizing agents, such as sulphide of ammonium or a mixture of alkalies with glucose or with finely-powdered zinc, (zinc-dust,) it is quickly converted into an artificial indigo-blue.

What I claim as new, and desire to secure by Letters Patent, is—

1. As a new article of manufacture, the diisatogen hereinbefore described and having the characteristics above stated.

2. The within-described process of producing diisatogen by treating orthodinitroacetenylphenyl with concentrated sulphuric acid and with fuming sulphuric acid, and then precipitating by means of alcohol or water, substantially as set forth.

In testimony whereof I have hereunto set my hand in the presence of two subscribing witnesses.

ADOLPH BAEYER.

Witnesses:
PAUL FRIEDLAENDER,
LUDVIG LUNDSBERG.